United States Patent

[11] 3,548,097

[72] Inventor Joseph Edward Thomas
Batavia, N.Y.
[21] Appl. No. 690,146
[22] Filed Dec. 13, 1967
[45] Patented Dec. 15, 1970
[73] Assignee Sylvania Electric Products Inc.
a corporation of Delaware

[54] TRANSISTORIZED CONTROL CIRCUITRY FOR TELEVISION RECEIVER
5 Claims, 4 Drawing Figs.

[52] U.S. Cl. 178/7.3
[51] Int. Cl. H04n 5/10
[50] Field of Search 178/7.3S, 6NS, 7.5S; 330/94; 307/295

[56] References Cited

UNITED STATES PATENTS

| | | | |
|---|---|---|---|
| 2,261,619 | 11/1941 | Foster | 330/94 |
| 2,601,191 | 6/1952 | Wendt | 178/7.3S |
| 3,109,061 | 10/1963 | Kramer | 178/6NS |
| 3,290,441 | 12/1966 | Humphrey | 178/7.5S |

*Primary Examiner*—Robert L. Griffin
*Assistant Examiner*—Anthony H. Handal
*Attorneys*—Norman J. O'Malley, Cyril A. Krenzer and Thomas H. Buffton

ABSTRACT: Transistorized automatic gain control and sync separator circuitry which increases the input impedance of the sync separator at high frequencies, such as random noise condition, and prevents loss of sync under conditions of high random noise level. Additional provisions are made so that adjustments of the automatic gain control will automatically change the sync separator bias to the optimum value for low level detector inputs. The increased sync separator impedance at high frequency noise level is accomplished without any high frequency loading of the video amplifier from which the sync separator signal is obtained.

INVENTOR.
JOSEPH E. THOMAS
BY
Cyril A. Krenzer
ATTORNEY

INVENTOR.
JOSEPH E. THOMAS
BY
Cyril A. Krenzer
ATTORNEY

TRANSISTORIZED CONTROL CIRCUITRY FOR TELEVISION RECEIVER

BACKGROUND OF THE INVENTION

In the television art, it is well known that electron beam movement in the camera at the transmitter must be exactly synchronized with the picture tube or display device at the receiver so that the scene viewed by the camera is faithfully reproduced at the receiver. This is accomplished by including synchronization and control pulses with the composite video signal, which pulses are operative in the receiver to synchronize the scan of the display tube with the scanning that has been affected at the transmitter. At the receiver, the control pulses are separated from the composite video signal by means of a sync separator circuit which transmits these pulses to suitable control circuitry in the receiver to effect the desired synchronized scanning of the receiver display device.

At the receiver antenna the strength of the intercepted signal may vary significantly for numerous uncontrollable reasons and thus the synchronizing pulses and composite video signal may also vary in amplitude to a considerable extent. Therefore, the receiver will include automatic gain control circuitry (AGC) operative in a manner such that the strength of the signal applied to the picture tube or display device remains substantially constant regardless of the strength of the received signal. In addition, the AGC is operative to prevent the composite video signal, and hence the synchronizing pulses contained therein, from exceeding predetermined excursion levels.

Along with the composite video signal received at the antenna of the receiver, there frequently occur random noise pulses often having an amplitude greater than that of the synchronizing pulses contained therein. Moreover, the sync separator circuitry and the AGC circuitry are dependent upon the amplitude of the synchronizing pulses for correct operation. In general, these random noise signals, or spikes, occur at a frequency level significantly higher than the level of the synchronizing pulses. One technique for diminishing the effect of random noise pulses on a sync separator circuit is to connect a gate transistor in series with the sync separator circuit, wherein the transistor is biased in saturation for signal amplitudes not exceeding that of the sync pulses. However, when the amplitude of the random noise pulses is greater than that of the sync pulses applied to the sync separator circuitry, the gate transistor is cut off to thereby prevent conduction of the sync separator device and discharge of the sync biasing network. This has proved effective for noise pulses which exceed the amplitude of the synchronization pulses, but is ineffective to control noise pulses which are lower or equal in amplitude to the synchronization pulses.

The problem of reducing the effect of random noise on sync separator circuitry and hence the receiver operation is further compounded in receivers that use transistorized sync separator means which operate with relatively low amplitude composite video signal voltages. Because of the low level sync pulses contained in such composite video signals, there is not a very large range of sync pulse amplitude which can be used to control the gating of the sync separator. Furthermore, the transistor is effectively a low impedance device compared to the impedance of a comparable electron tube. It is, therefore, difficult to filter the random noise signal at the input of the transistorized sync separator since this type of a filtering network results in a high frequency loading of the video amplifier circuitry, thereby diminishing the gain of such circuitry for the relatively high frequency signals contained in the composite video signal. A further difficulty has been experienced when it becomes desirable to change the AGC bias voltage. With prior art circuits, changing of the AGC level effectively alters the amplitude of a sync pulse applied to the sync separator circuitry, but does not concurrently alter the bias level of the sync separator circuitry, with the result that the sync separator circuitry may not clamp properly, or in the alternative may go into conduction on low level signals such as video or noise signals.

One method of attacking the random noise problem in transistorized circuitry is to provide a multiple stage sync separator network which permits filtering in between the various stages of amplification of the sync separator network without adversely affecting the video amplifier. However, this solution is undesirable because it adds extra components to the system and hence adversely affects the cost of the system.

OBJECTS AND SUMMARY OF THE INVENTION

Accordingly, it is a principal object of this invention to provide improved sync separator circuitry which overcomes the foregoing deficiencies of the prior art.

Another object of the present invention is to provide highly noise-immune transistorized sync separator circuitry which does not result in high frequency loading of the video amplifier circuitry.

Still another object of the invention is to provide transistorized sync separator and automatic gain control circuitry wherein changing of the automatic gain control level is simultaneously tracked by the sync separator circuitry.

Still another object of the invention is to provide transistorized sync separator circuitry having high noise immunity, yet being economical in design and reliable in operation.

According to one aspect of the invention, the composite video signal including the synchronization pulses are derived from one stage of the video amplifier and applied to the base of a sync separator transistor. The transistor is biased to be nonconducting for pulses which are less than the minimum synchronization pulse level and is further biased to clamp in saturation when synchronization pulses are applied thereto. Taking advantage of the current characteristics of the transistor, a device having maximum impedance at higher frequencies, such as a choke, is connected in series with the emitter terminal of the transistor to thereby provide a high impedance to the random noise signal pulses which are encountered at the base of the sync separator transistor. The value of the choke is chosen to pass the lower frequency control pulses at full gain, but to attenuate the higher frequency random noise pulses.

DESCRIPTION OF THE PREFERRED EMBODIMENTS

For a better understanding of the present invention, together with other and further objects, advantages, and capabilities thereof, reference is made to the following disclosure and appended claims in connection with the above-described drawings.

Figure 1:
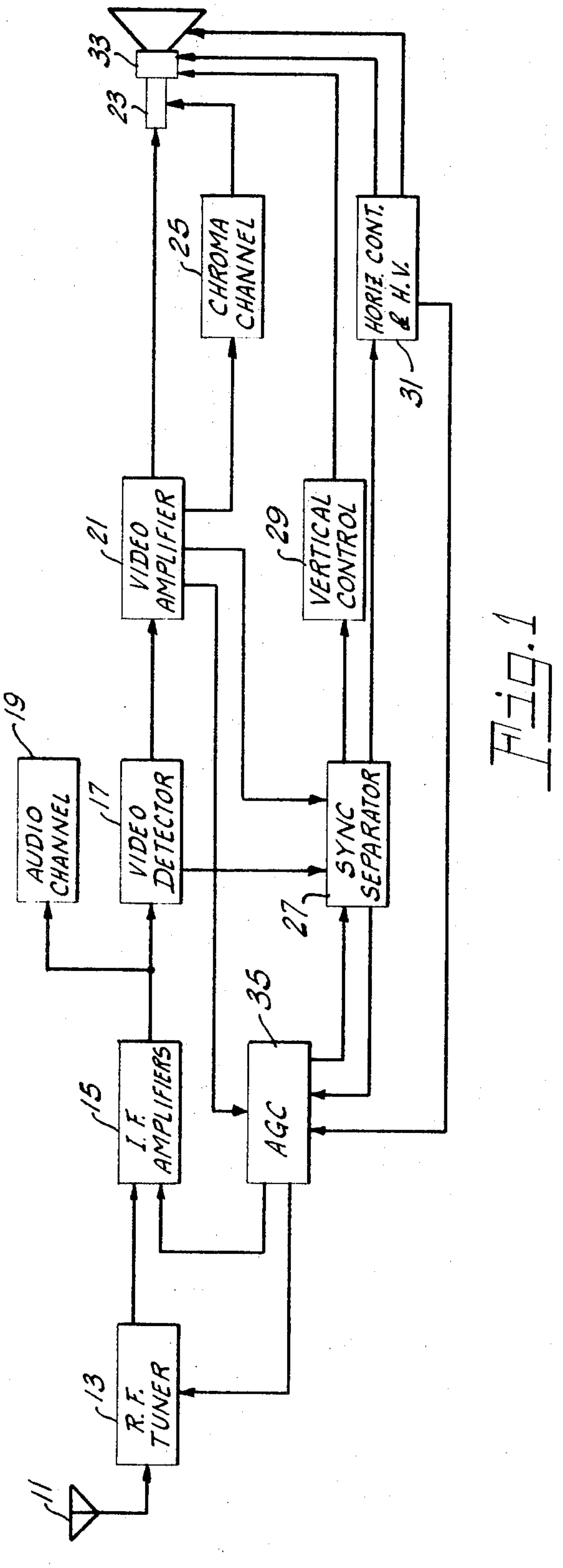
FIG. 1 is a block diagram of a television receiver in which the present invention finds utility.

Referring now to the block diagram of FIG. 1, the modulated RF signal from the antenna 11 is applied to the RF tuner amplifier circuitry 13 wherein the carrier is heterodyned down to the intermediate frequency applied to the IF amplifiers 15. The output from the IF amplifiers is applied to the video detector 17 and to the audio channel 19 wherein the audio signal component is suitably processed to reproduce the sound portion of the signal. The video detector strips the IF carrier from the composite video signal and the output of the detector is applied to the video amplifier 21. In the video amplifier, the luminance portion of the composite video signal is detected and applied to the cathode ray tube display device 23 and the chrominance components of the composite video signal are applied from the video amplifier to the chroma channel 25 where they are suitably processed and thence applied to the cathode ray tube. In addition, an output from the video amplifier goes to the sync separator circuitry 27 which separates the synchronization pulses from the composite video signal and applies these pulses to the vertical 29 and horizontal control circuitry 31. The outputs from the vertical and horizontal control circuitry are applied to deflection apparatus 33 mounted on the neck of the cathode ray tube 23 to provide synchronized scanning of the cathode ray tube. A portion of the horizontal control signal generated is used to produce the high voltage necessary for the cathode ray tube and, in addition, from the high voltage circuitry a signal is returned to the automatic gain control network 35. The AGC network also received signal inputs from the video amplifier and the video detector via the sync separator, and generates gain control signals which are applied to the RF tuner and the IF amplifiers to provide a constant signal output, thereby producing a uniform reproduction of the received signal even though there may be variations in received signal strength.

Figure 2:
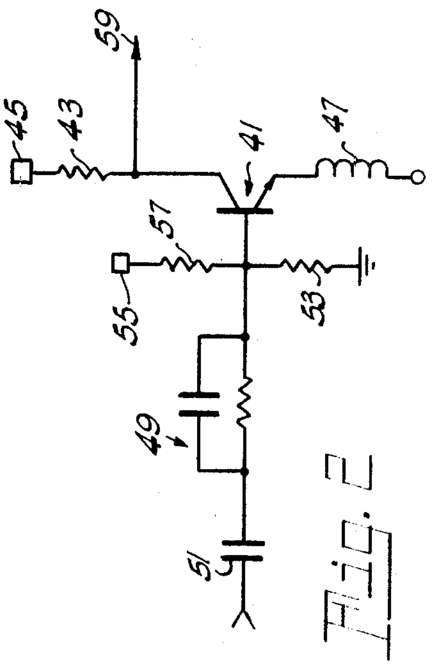
FIG. 2 is a schematic circuit diagram of a sync separator circuit according to the present invention.

Referring next to FIG. 2, one embodiment of a sync separator circuit according to the present invention consists of a transistor 41 having its collector electrode connected via a resistor 43 to a source of energizing potential as represented by the terminal 45. An inductor 47 is connected in series with the emitter electrode of the transistor, and a parallel RC network 49 is connected in series with a capacitor 51 between an input terminal and the base of the transistor. The base of the transistor 41 is also connected to ground via a resistor 53 and to a source of bias potential, as represented by the terminal 55, by means of a resistor 57. The circuit output 59 is taken from the collector electrode of the transistor.

In operation, the circuit receives the composite video signal from the video amplifier in the receiver and separates the sync pulses therefrom, applying the sync pulse outputs at terminal 59 through suitable output circuitry to the horizontal and vertical control circuits. The bias network consisting of resistors 53 and 57 connected between the source of bias potential 55 and ground to the base of the transistor, bias the transistor to be nonconducting when the incoming composite video signal level is less than the predetermined sync level. When a sync pulse appears at the input, the sync pulse amplitude overcomes the reverse bias on the base to emitter junction of the transistor, and the transistor rapidly goes into saturation. During the conduction cycle, the capacitor 51 becomes negatively charged so that, at the end of the sync pulse, this capacitor provides a negative bias which helps to maintain the cutoff condition of the transistor 41. The discharge time constant is chosen such that the capacitor 51 retains a sufficiently negative potential in the period between adjacent sync pulses. A problem arises when noise pulses appear between adjacent synchronization pulses. The noise pulses tend to discharge the capacitor 51 and render the transistor 41 conducting. If this occurs, the clipping level of the sync separator transistor is altered, the lower level video information will be passed through, thereby providing false output sync signals adversely affecting the CRT display. However, taking cognizance of the fact that the transistor is essentially a current sensitive device and that the noise pulses which appear are of a relatively high frequency, by placing the inductor 47 in series with the emitter electrode, these high frequency noise pulses at the base of the transistor sees an effective impedance equaling the beta of the transistor times the value of the inductance 47. Therefore, there is no more than minimal conduction of the transistor 41 during the occurrence of a high frequency noise pulse, thereby retaining the appropriate charge on the bias capacitor 51.

Figure 3:
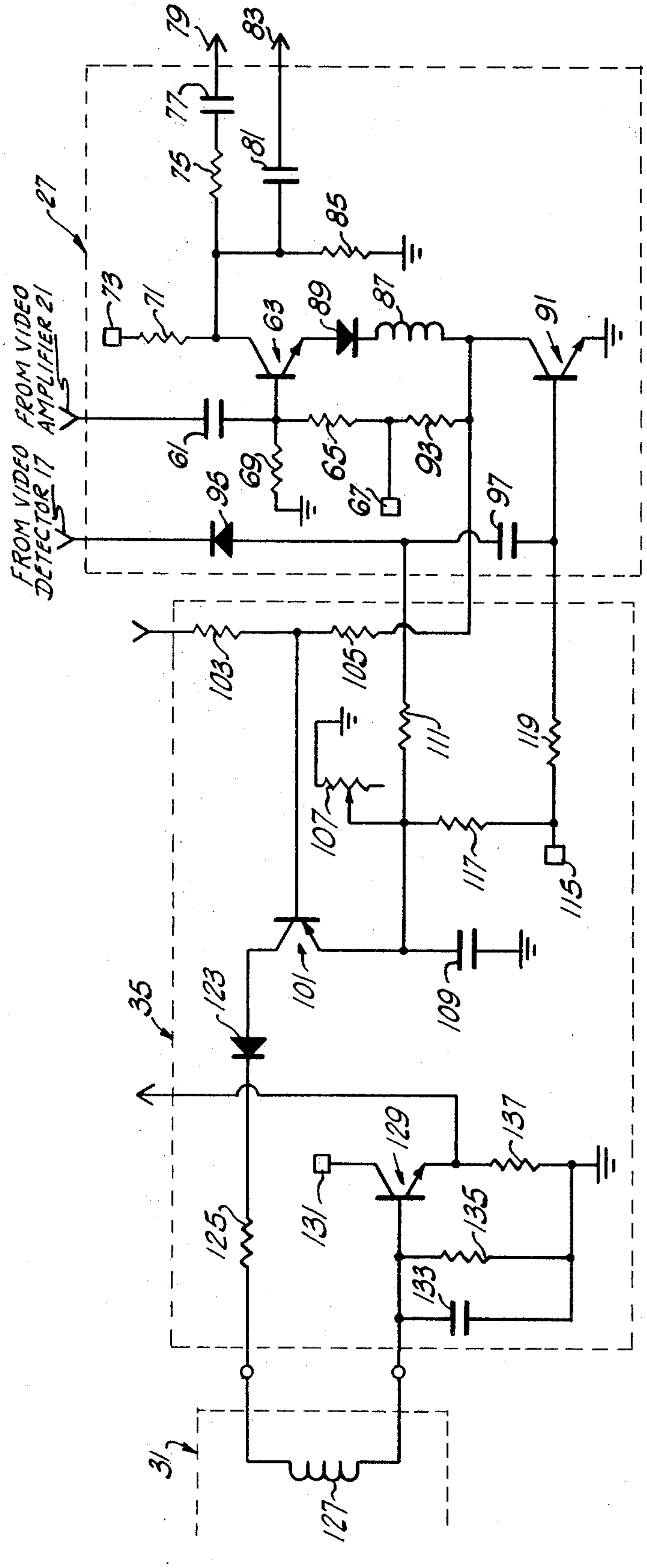
FIG. 3 is a schematic circuit diagram of sync separator circuitry and AGC circuitry according to the present invention.

A modified version of the sync separator circuit of FIG. 2 is illustrated in FIG. 3, as used in conjunction with an automatic gain control circuit. The sync separator circuit 27 receives the input from the video amplifier 21, which is coupled via a capacitor 61 to the base of the sync separator transistor 63. The base of the transistor is connected via a resistor 65 to a source of bias potential 67, and is also connected via a resistor 69 to a point of reference potential, such as ground. The collector electrode is connected via a resistor 71 to a source of energizing potential 73, and is additionally connected through a resistor 75 in series with a capacitor 77 to an output terminal 79, going to the vertical control circuitry. The collector electrode is also connected via a capacitor 81 to output terminal 83 going to the horizontal control circuitry and is connected to ground by a resistor 85. An inductor 87 in series with a diode 89 is connected between the emitter electrode of the sync transistor 63 and the collector electrode of a noise gate transistor 91. The collector electrode of the noise gate transistor 91 is also connected via a resistor 93 to the source of bias potential 67. An input from the video detector 17 is coupled via a diode 95 in series with a capacitor 97 to the base electrode of the gate transistor 91.

The keyed automatic gain control circuit 35 includes a gate transistor 101 connected having its base electrode connected via a resistor 103 to an input from the video amplifier 21 and via a resistor 105 to the collector electrode of the gate transistor 91 of the sync separator 27. The emitter electrode of the AGC gate transistor is connected to the center tap of a bias potentiometer 107 and is also connected to ground via a capacitor 109. A resistor 111 is connected between the center tap of potentiometer 107 and the junction of the diode 95 and capacitor 97 in the sync separator 27. The emitter electrode of the transistor 101 is additionally connected to a source of bias potential 115 via a resistor 117, this bias potential also being connected via a resistor 119 to the base electrode of the aforementioned noise gate transistor 91 of the sync separator 27. The collector electrode of the transistor 101 is connected via a diode 123 in series with a resistor 125 through a winding 127 in the horizontal control circuitry 31 to the base electrode of an AGC amplifier transistor 129. The collector electrode of the amplifier transistor 129 is connected to a source of energizing potential as represented by the terminal 131. The base electrode of the transistor 129 is connected to ground by means of a capacitor 133 in parallel with a resistor 135, and the emitter electrode is connected to ground via a resistor 137. The output from the automatic gain control circuit 35 is taken from the emitter electrode of the transistor 129 and applied to the RF and IF amplifiers of the receiver as required.

The sync separator circuitry 27 of FIG. 3 operates in essentially the same manner as the circuit of FIG. 2. In addition, the noise gate transistor 91 is operative to prevent conduction of the sync separator transistor on noise pulses having amplitudes greater than the sync pulse amplitude. The transistor 91 is biased to saturation for signals having amplitudes which do not exceed the established sync pulse amplitude. When high level noise pulses occur in the composite video signal, they appear of positive polarity at the input terminal coupled via capacitor 61 to the base of the sync separator transistor 63 and will tend to turn this transistor on and drive it into saturation. However, in time coincidence with the positive polarity noise pulse applied to the base of transistor 63, there occurs the same noise signal but of negative polarity from the video detector coupled via the diode 95 and capacitor 97 to the base of the gate transistor 91. This negative noise pulse turns the gate transistor 91 off, raising the positive potential at its collector electrode and hence at the emitter electrode of the sync separator transistor 63, thereby increasing the reverse bias on the base-to-base emitter junction, which prevents the high level noise pulse from turning on the sync separator circuit.

The keyed AGC circuit 35 of FIG. 3 operates in a relatively straight forward manner utilizing the amplitude of the synchronizing pulses to establish the automatic gain control level. A negative composite video signal from the video amplifier is coupled via the resistor 103 to the base of the AGC gate transistor 101. The transistor 101 conducts only when a sync pulse of sufficient amplitude (negative) is applied to its base and coincidentally a retrace pulse is coupled to the collector of the transistor from the horizontal control circuitry 31, i.e., by transformer coupling from the flyback transformer. When two such pulses appear in time coincidence, the sync pulse is coupled to the base of the AGC amplifier transistor 129 causing the transistor to conduct in proportion to the amplitude of the sync pulse. This, in turn, charges the capacitor 133 to provide a bias on the amplifier transistor 129 which remains relatively constant between successive sync pulses, and the AGC voltage is taken from the emitter electrode across the resistor 137 and applied to the selected RF or IF amplifier stages.

Figure 4:
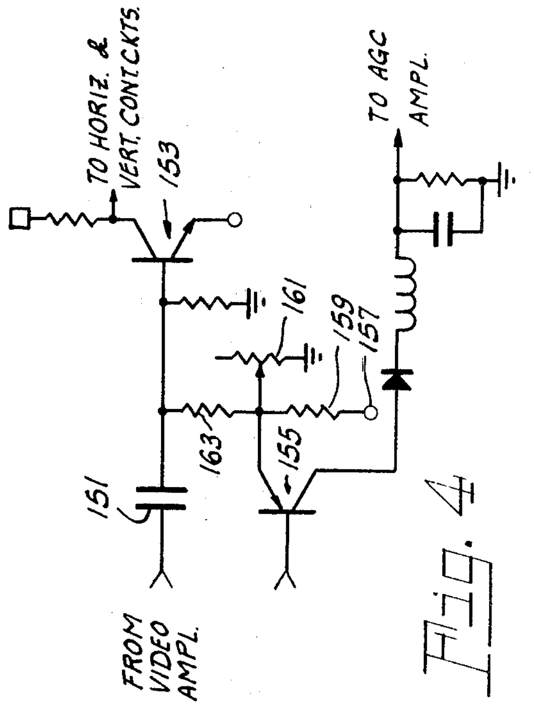
FIG. 4 is a schematic circuit diagram of an alternate embodiment of a sync separator circuit and automatic gain control circuit according to the present invention.

Referring next to FIG. 4, there is shown an alternate embodiment of portions of the sync separator circuitry and automatic gain control circuitry as envisioned by the present invention. In this embodiment, the input from the video amplifier is coupled via a capacitor 151 to the base electrode of the sync separator transistor 153, with the output to the horizontal and vertical control circuits being taken from the collector electrode of the sync transistor. Also, an input from the video amplifier is suitably applied to the base electrode of the AGC input transistor 155 with the output being taken from the collector thereof and applied to the AGC amplifier in a suitable fashion. In this embodiment, the bias for the sync transistor base electrode is derived from the source of bias potential as represented by the terminal 157. This source of potential is connected via a resistor 159 to the center tap of a bias potentiometer 161. The center tap of the bias potentiometer 161 is connected directly to the emitter electrode of transistor 155 and is connected via a resistor 163 to the base electrode of the sync transistor 153. Using this configuration, if the AGC level is changed by adjusting the potentiometer 161, the sync separator bias level will also be changed, thereby providing tracking between the AGC level and the sync separator level. This type of operation is especially desirable for use with low level signal detection circuitry to enhance the sync separator circuit operation and insure that the sync separator clip and clamp levels will remain constant relative to the proportioning of the synchronization signals as determined by the amplification factor due to the automatic gain control circuitry.

Thus, there has been provided improved AGC and sync separator circuitry having high noise immunity yet of relatively simple design, thereby providing highly reliable and economical circuit construction and operation. This circuitry is readily adaptable for use in low level video signal systems, for example, in receivers using solid state RF and IF stages. Also, with the described circuitry, it is possible to vary the AGC level without adversely affecting the relative clip and clamp levels of the sync separator circuitry.

While there have been shown and described what are at present considered the preferred embodiments of the invention, it will be obvious to those skilled in the art that various changes and modifications may be made therein.

I claim:

1. In a television receiver including RF, IF and video amplifiers, vertical control circuitry and horizontal control circuitry, wherein an RF signal modulated by a composite video signal including horizontal and vertical synchronizing pulses is processed through the RF, IF and video amplifiers to yield the composite video signal and wherein the received signal may vary in amplitude and contain random signal components, improved control circuitry comprising:

a sync separator circuit adapted to receive the composite video signal from the video amplifier and operative to separate the synchronizing signals from the composite video signal;

means connecting the output of said sync separator circuit to the horizontal and vertical control circuitry, respectively;

an automatic gain control circuit adapted to receive the composite video signal from the video amplifier and control signals from the horizontal control circuitry, operative thereby to provide output signals to the IF amplifier to maintain constant amplification of signals passing therethrough; and adjustable biasing means connected to said automatic gain control circuit for adjusting a bias supplied to said automatic gain control circuit to thereby adjust the automatic gain control level, and further connected to said sync separator circuit for varying the clipping level of said sync separator circuit when the automatic gain control level is adjusted.

2. The invention according to claim 1 wherein said sync separator circuit comprises:

a transistor having base, emitter and collector electrodes with the base electrode adapted to receive the composite video signal from the video amplifier and the collector electrode being the output connected to the horizontal and vertical control circuitry, respectively;

frequency dependent impedance means connected in series with the emitter electrode of said transistor, operative to present increased input impedance to high frequency noise signals yet having negligible effect on the synchronizing pulses; and means connecting said biasing means to the base electrode of said transistor.

3. The invention according to claim 2 wherein said sync separator circuit additionally comprises:

a second transistor having base, emitter and collector electrodes wherein said frequency dependent impedance means is connected in series between the collector electrode of said second transistor and the emitter electrode of said first transistor;

second biasing means connected to the base electrode of said second transistor, operative to maintain said second transistor conducting in saturation under quiescent operating conditions; and means coupling signals from the video amplifier to the base electrode of said second transistor, operative thereby to cut off said second transistor when the signal from the video amplifier exceeds a predetermined amplitude.

4. The invention according to Claim 2 wherein said frequency dependent impedance means is an inductor.

5. The invention according to claim 4 additionally comprising a diode connected in series with said inductor.